United States Patent [19]

Ipolyi

[11] 4,286,295
[45] Aug. 25, 1981

[54] DEVICE FOR ERASING VISIBLE RECORDED SIGNALS FROM A RECORDING MEDIUM HAVING ORIENTED MAGNETIC COMPONENTS

[76] Inventor: George Ipolyi, 91 Fulton St., Brentwood, N.Y. 11717

[21] Appl. No.: 50,967

[22] Filed: Jun. 22, 1979

[51] Int. Cl.³ .............................. G11B 5/47; G11B 5/12
[52] U.S. Cl. ........................................ 360/66; 360/118
[58] Field of Search ......................... 360/118, 66, 137; 346/74.1

[56] References Cited

U.S. PATENT DOCUMENTS

| | | | |
|---|---|---|---|
| 3,351,717 | 11/1967 | Metz | 360/118 |
| 3,644,685 | 2/1972 | Moussette | 360/118 |
| 3,755,631 | 8/1973 | Sturzinger | 360/66 |
| 3,846,830 | 11/1974 | Stauffer | 360/56 |
| 3,879,754 | 4/1975 | Ballinger | 360/118 |
| 4,063,296 | 12/1977 | Fremstedal | 360/118 |
| 4,157,581 | 6/1979 | Keiichi | 360/66 |

*Primary Examiner*—Vincent P. Canney
*Attorney, Agent, or Firm*—Edward H. Loveman

[57] ABSTRACT

A device for erasing visible recorded signals from a recording medium such as an elongated tape, sheet or web having oriented magnetic components. The carriage carries one or a plurality of rotatable magnets which rotate in a plane parallel to the recording medium. The magnets may be supported by pulleys on which is entrained an endless belt. The pulleys may be operatively coupled by a gear train to a rack gear on a frame so that the magnets rotate when the pulleys are driven and the carriage is moved along the frame. Alternatively, the pulleys may be coupled to a motor which drives the magnets. Spaced or contiguous paths are traversed by magnetic fields maintained by the rotating magnets. The recording medium may be drawn underneath the carriage which is stationary, or the recording medium may be stationary and the carriage moved along the recording medium, or the recording medium and carriage may be moved simultaneously. The rotating magnetic fields restore the orientated magnetic components in the recording medium to preoriented condition thus erasing the recorded signals.

8 Claims, 8 Drawing Figures

DEVICE FOR ERASING VISIBLE RECORDED SIGNALS FROM A RECORDING MEDIUM HAVING ORIENTED MAGNETIC COMPONENTS

This invention concerns apparatus in which signals recorded by reorient magnetic flakes in a sheet or web can be erased by rotating magnetic fields to reorientate the flakes to preorientated positions.

Recording mediums responsive to force fields for recording and reproducing visible signals are known and have been described in U.S. Pat. Nos. 3,633,720 and 3,683,382. The recording medium in the form of a tape, sheet or web contains flakes responsive to force fields. These flakes are preoriented when no message is recorded on the medium. When force fields are appropriately applied the flakes are reoriented so as to reflect light selectively and display a recorded message or signal. The message or signal is erased by drawing the tape, web or sheet passed a magnet which reorients the flakes to preoriented position or condition.

The present invention is directed at apparatus which erases recorded signals from such recording mediums more efficiently, effectively and quickly.

The device embodying the invention includes one or more rotating or spinning magnets which are moved along a web or sheet to orient the reoriented reflective flakes to preoriented position. The magnets are supported in a carrier which may be moved by hand or mechanically. The rotating magnets can be arranged to erase one or more narrow paths along the web, or to erase a path extending across the entire width of the web. The web or sheet can be stationary or can be drawn continuously beneath the device while the magnets rotate and move in their carriage along the web. Alternatively the carrier can remain stationary while the web is moved beneath the magnets.

It is, therefore, a principal object of the present invention to provide a device for erasing a visible recorded signal from a recording medium.

It is another object of the present invention to provide a device of the type described comprising at least one rotating magnet which is arranged to travel over a path along the medium.

These and other objects and many of the attendant advantages of this invention will be readily appreciated as the same becomes better understood by reference to the following detailed description when considered in connection with the accompanying drawings in which.

Figure 1:
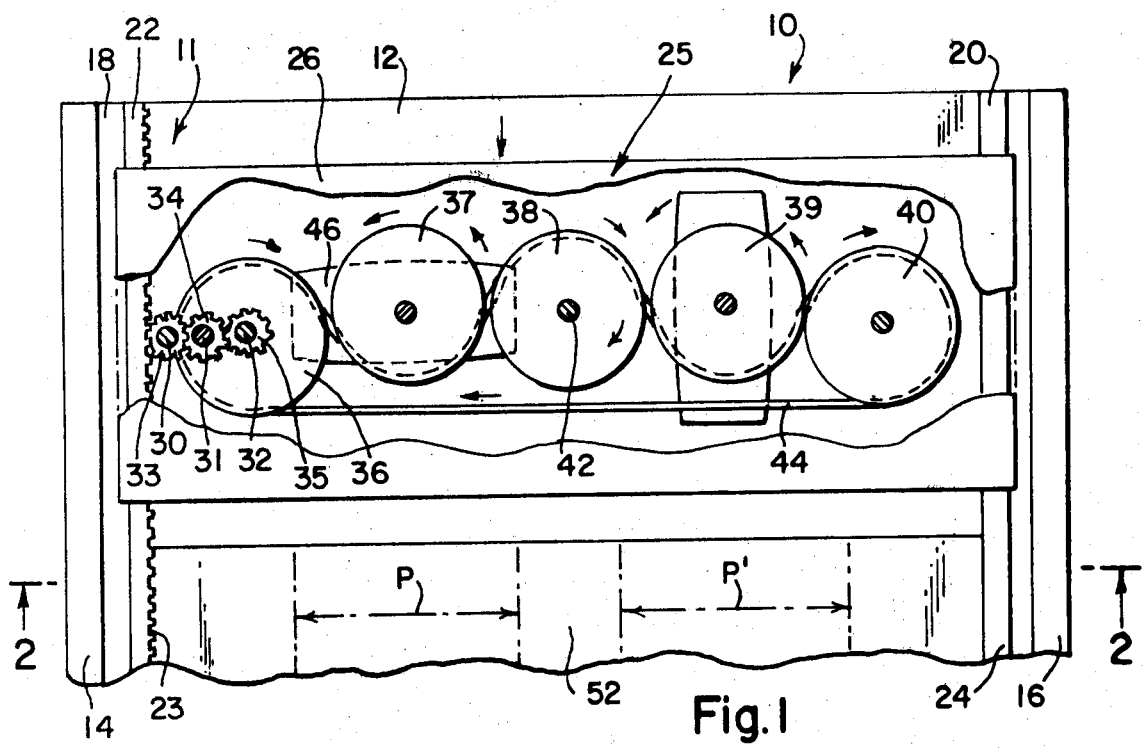
FIG. 1 is top plan view with portion broken away of a device embodying the invention.
Figure 2:
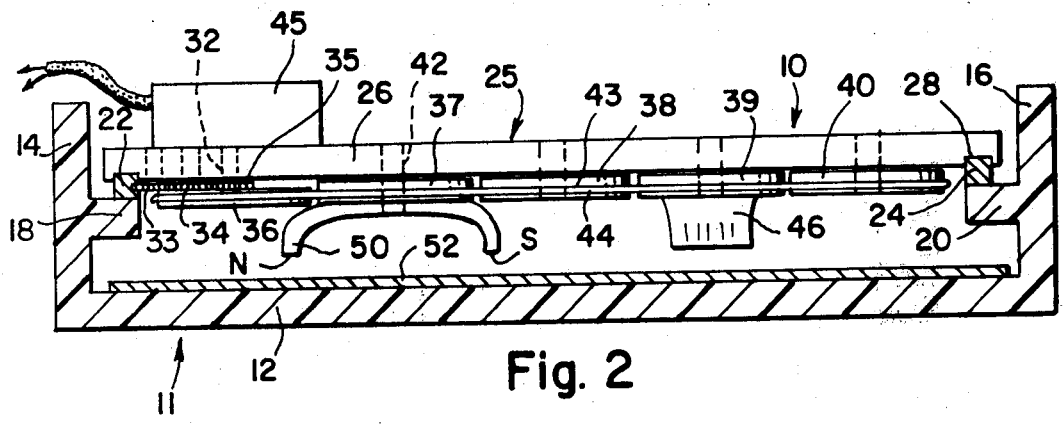
FIG. 2 is a vertical cross-sectional view taken on line 2—2 of FIG. 1.

Referring now to the drawings wherein like reference characters designate like or corresponding parts throughout, there is illustrated in FIGS. 1 and 2 a signal erasing device generally designated as reference numeral 10 having a frame 11 including a flat rectangular bed plate or platform 12 with two lateral, vertical walls 14, 16. Extending inwardly of these walls 14, 16 are two horizontal ledges 18, 20 extending the full length of the frame 11. Mounted on the ledge 18 is a stationary rack gear 22. Mounted on the ledge 20 is a guide rail 24. Both the rack gear 22 and the rail 24 are horizontal and extend the full length of the frame 12. The teeth 23 of the rack gear 22 extend inwardly toward the rail 24.

Slidably mounted on the ledges 18, 20 in the frame 11 is a carrier or carriage 25, which includes a flat rectangular plate 26 having a pair of parallel grooves 28 in its underside. The grooves 28 receive and slidably engage on the tops of the rack gear 22 and the rail 24. Set in the plate 26 are three axially vertical stub shafts 30, 31 and 32 supporting three small meshed rotatable spur gears 33, 34, 35. At the underside of the plate 26, the gear 33 meshes with the teeth 23 of the rack gear 22. The shaft 32 rotatably supports a pulley or pulley wheel 36. Four other pulley wheels 37, 38, 39 and 40 are each rotatably supported by a respective shaft 42 at the underside of th plate 26. An endless belt 44 is entrained on and around all of the pulleys 36, 37, 38, 39 and 40. The belt 44 is engaged in a circumferential groove 43 in each of the pulleys 36 through 40, alternately in front of one pulley and in back of the adjacent pulley so all pulleys rotate at once but adjacent ones rotate in opposite directions. The front course of the belt 44 extends across the device between pulleys 36 through 40 underneath plate 26. An electric motor 45 may optionally be mounted on top of plate 26. The motor 45 will drive the shaft 32 and belt 44 causing all the pulleys to rotate.

Pulleys 37 and 39 carrying two permanent magnets 46 shown in FIGS. 1–5. Each of the magnets 46 have flat top portions 49 secured to the respective shaft 42. Each of the legs 50 of the magnet 46 are oppositely polarized N and S and extend downwardly toward the bed plate 12. A web or sheet 52 comprised of a force field responsive recording medium, can be placed on the bed plate 12. The web 52 can be stationary during operation of the device or it can be drawn lengthwise through the device during operation.

In operation of the device, the carriage 25 can be moved manually along the frame 12 in direction D. The gear 33 engaged by the rack gear 22 will rotate the gear 34 which in turn rotates the gear 35. The gear 35 turns the pulley 36. The gear train advances the endless belt 44 which rotates the pulleys 37–40. The magnets 46 rotate simultaneously and sweep along two paths P and P' along the web 52, magnetically erasing recorded signals therefrom. Rotation of the magnetic fields maintained by the permanent magnets 46 more effectively and quickly restores the magnetic flakes in the recording medium to preoriented condition. The motor 45 can be turned on, whereupon the carriage 25 will be moved automatically and continuously along the frame 12 while the magnets 46 rotate, magnetically erasing recorded signals from the web 52. The web 52 can be stationary or drawn by hand or by mechanical means continuously through the device. The motor 45 can be arranged to reverse automatically its direction of drive.

Figure 6:
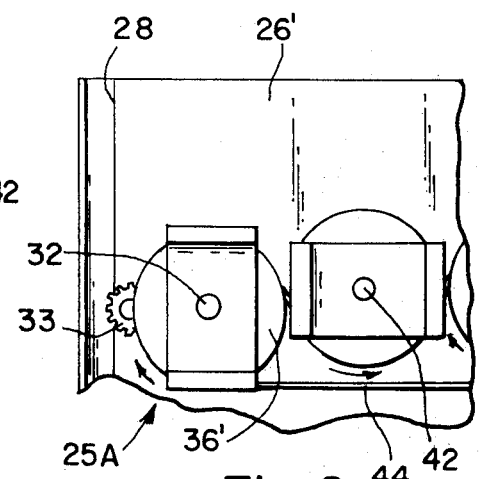
FIG. 6 is a bottom plan view of a portion of the carriage of FIG. 5.
Figure 5:
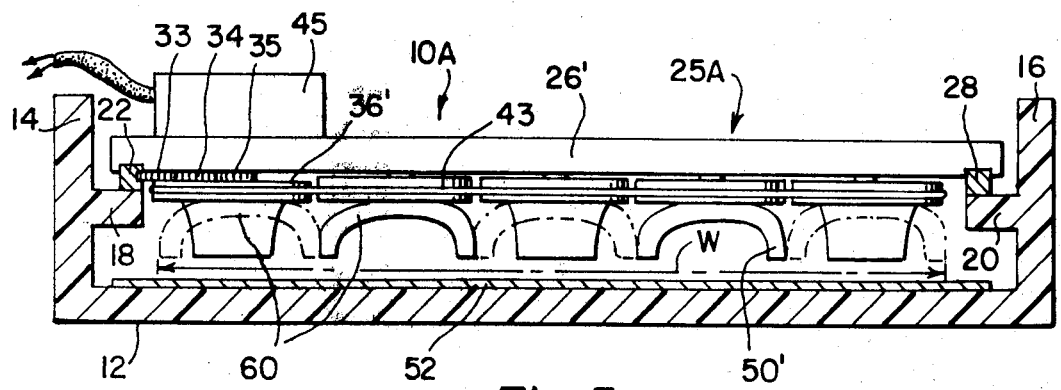
FIG. 5 is a vertical cross-sectional view similar to FIG. 2 showing a device embodying another form of the invention.

FIG. 6 illustrates another signal erasing device 10A which is similar to device 10 having a carriage 25A. Here smaller magnets 60 with N and S poles 50' are mounted at the undersides of all the pulleys 36' and rotate therewith under a platform 26'. The several adjacent magnets 60 are oriented 90° apart so that the poles 50' will not interfere with each other while rotating. The magnets 60 are arranged so that they sweep across substantially the entire width W of the web or sheet 52 on the bed plate 12 as carriage 25A moves over the recording medium 52 in the frame 11, or as the recording medium 52 is drawn through the device, and the carriage 25A is stationary or is propelled by the motor 45. The magnets maintain rotating magnetic fields in the recording medium 52 as the carriage 25A and recording medium 52 move with respect to each other.

The pulleys, belt and other parts of the devices 10 and 10A other than the rotatable magnets are preferably made of non-magnetic material such as plastic. If signals are to be erased from a narrow tape, only a single rotating magnet may be required. Alternatively if two tapes are to be erased, the separate tapes can be drawn continuously under the magnets 46, independently of each other. Device 10A is specially adapted for magnetically erasing recorded signals from the entire width of a web or sheet at one time.

It will be noted that the motor 45 drives the carriage 25 in the frame 11 along the elongated recording medium 52 while the magnets 46 simultaneously rotate in a plane parallel to the recording medium and traverse parallel paths along the medium. The paths are spaced apart in the device 10 and are contiguous in device 10A. If gear 33 is removed or disengaged, the carriage 25 or 25A will remain stationary but the pulleys will rotate and the magnets will also rotate simultaneously. If the recording sheet or web is then drawn manually or mechanically through the device, the magnetic components in the recording medium will be restored to preoriented condition.

Figure 8:
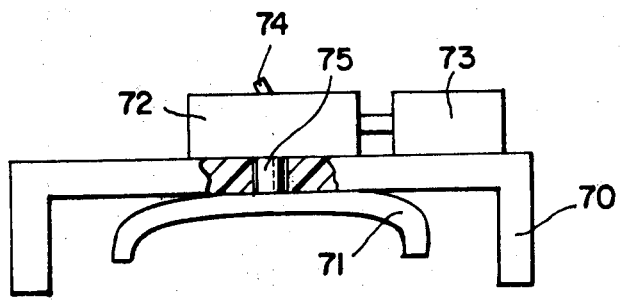
FIG. 8 is another embodiment of the present invention.
Figure 4:
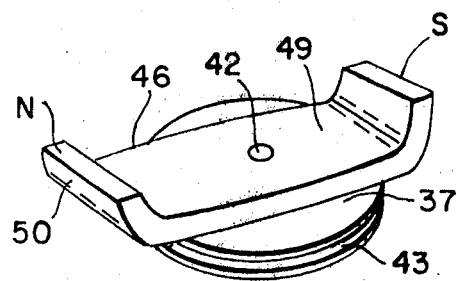
FIG. 4 is a perspective view of a rotatable magnet in inverted position.
Figure 7:
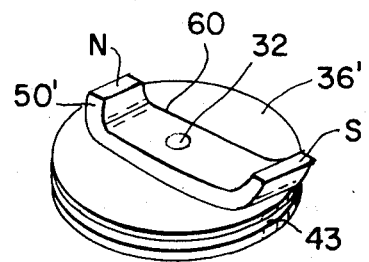
FIG. 7 is a perspective view of a rotatable magnet used in the device of FIGS. 5 and 6, shown in inverted position.
Figure 3:
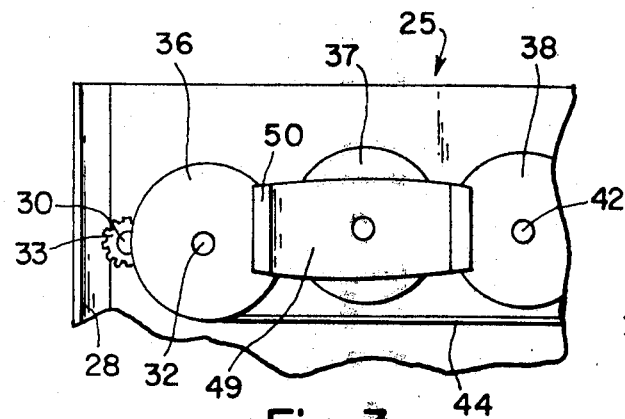
FIG. 3 is a bottom plan view of a portion of the carriage carrying rotating magnets, forming part of the device.

FIG. 8 illustrates another embodiment wherein a device 25B is a portable unit and comprises a housing 70 having at least one rotating magnet 71 driven via a drive means 75 and a conventional electric motor 45 operated by a switch 74 and batteries 73. In operation the switch 74 is operated to energize the motor 45 via the batteries 73 to rotate the magnet 71 via the drive means 75 which may comprise a shaft and or gears as previously described in connection with FIG. 1. The device 25B may be held by an operator and passed traversely over a medium having recorded signals thereon. The magnet 71 is rotated continuously by the drive motor 45 and will erase the recorded signals.

It will be apparent from the foregoing that the signals can be erased from the recording medium while the recording medium is stationary and the carriage moves along the medium, or while the recording medium moves below the device while the carriage is stationary, or while both recording medium and carriage both move. In all modes of operation all magnets rotate continuously and simultaneously.

It should be understood that the foregoing relates to only a limited number of preferred embodiments of the invention which have been by way of example only and that they are intended to cover all changes and modifications of the examples of the invention, herein chosen for the purposes of the disclosure, which do not constitute departures from the spirit and scope of the invention.

What is claimed is:

1. A device for erasing recorded signals from an elongated recording medium having oriented magnetic components responsive to force fields, comprising:
    a carriage;
    a permanent magnet supported by said carriage and having N and S poles disposed adjacent said medium;
    at least one other permanent magnet supported by said carriage and having other N and S poles disposed adjacent said medium, said other permanent magnet axially spaced along said carriage from said first mentioned permanent magnet; and
    rotatable drive means coupled to said magnets, between said poles of each of said magnets, and arranged to rotate the poles of each of said magnets in a plane parallel to said medium for restoring said magnetic components to preoriented condition.

2. A device as defined in claim 1 wherein said drive means comprises a motor mounted on said carriage and operatively coupled to said magnets to rotate the same.

3. A device as defined in claim 1, further comprising a support for said medium, said carriage being moveable in said support; and wherein said drive means comprises gear means operatively engaged with said support and said magnets to rotate said magnets when said carriage is moved over said medium.

4. A device as defined in claim 3, further comprising carriage drive means mounted on said carriage and arranged to drive said carriage in said support while said magnets rotates and traverse a path along said medium.

5. A device as defined in claim 1, wherein said magnets are spaced apart so that said paths are spaced apart across said medium.

6. A device as defined in claim 1, wherein said magnets are disposed adjacent to each other so that said paths are contiguous across said medium.

7. A device as defined in claim 1, wherein said other drive means comprises:
    a plurality of pulleys rotatably carried by said carriage, one of said pulleys being operatively coupled to and driven by said gear means; and
    a belt entrained on said pulleys so that all of said pulleys rotate when said one pulley is rotated.

8. A device as defined in claim 7, wherein said carriage drive means comprises a reversible motor operatively coupled to said gear means and to said pulleys so that all pulleys and magnets rotate simultaneously while said carriage is driven in said support along said medium.

* * * * *